T. P. ERIKSEN.
POTATO DIGGER.
APPLICATION FILED MAR. 4, 1912.
1,183,963.
Patented May 23, 1916.
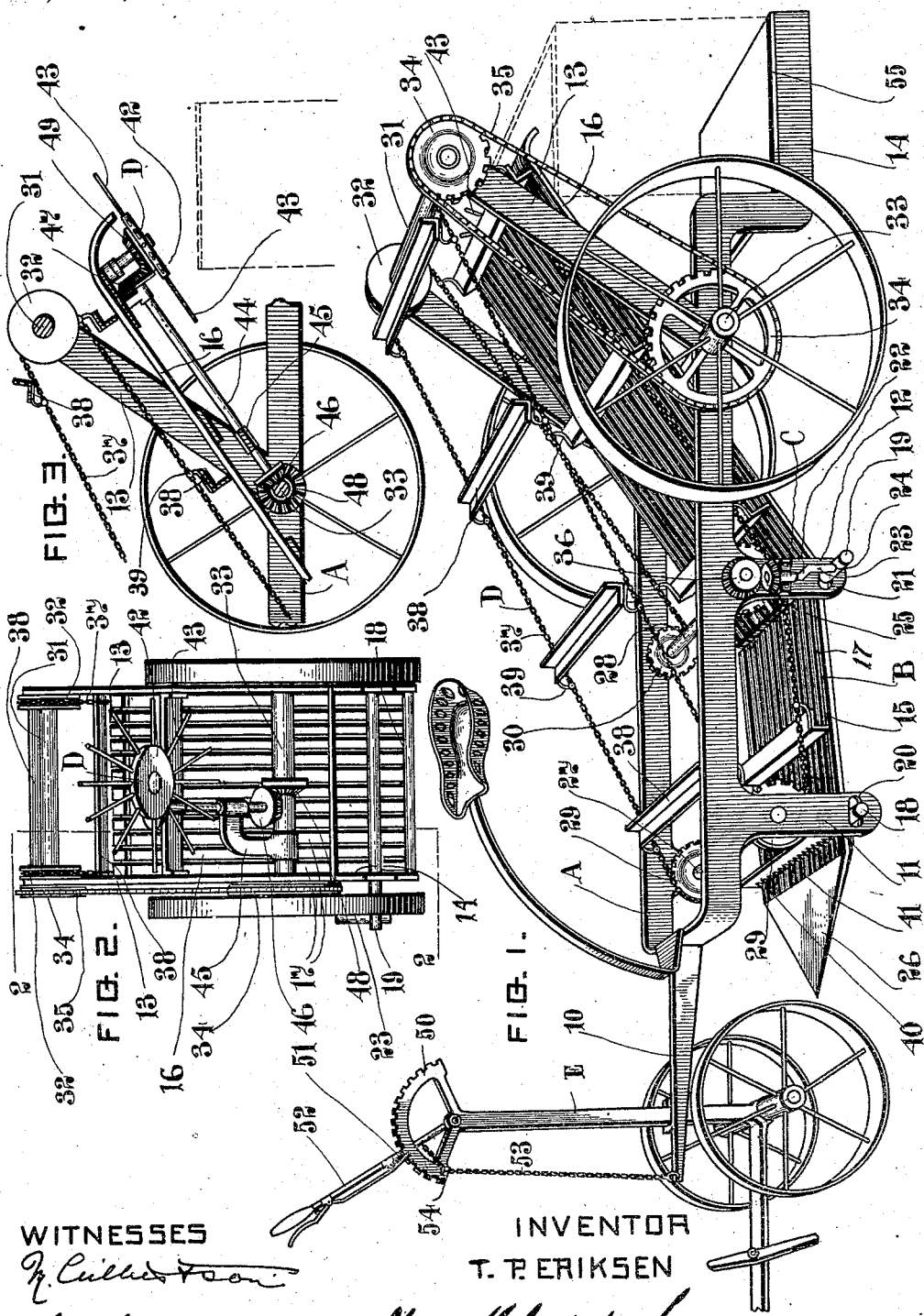
WITNESSES
INVENTOR
T. P. ERIKSEN
BY _____ ATTY.

UNITED STATES PATENT OFFICE.

THÓGER PETER ERIKSEN, OF OTTAWA, ONTARIO, CANADA.

POTATO-DIGGER.

1,183,963. Specification of Letters Patent. Patented May 23, 1916.

Application filed March 4, 1912. Serial No. 681,596.

*To all whom it may concern:*

Be it known that I, THÓGER PETER ERIKSEN, of 410 Gilmour street, in the city of Ottawa, Province of Ontario, Dominion of Canada, have invented certain new and useful Improvements in Potato-Diggers, and do hereby declare that the following is a full, clear, and exact description of the same.

My invention relates to potato digging machines, and the objects of my invention are to provide a potato digger which will thoroughly unearth all the potatoes, cleanse them of earth and green matter and deliver them into a suitable receptacle.

Another object of my invention is to provide a machine of the character above described which may be readily adjusted to meet any depth at which the potatoes may be planted.

Minor objects are to construct a machine of the above type which is thoroughly efficient and of few and cheap parts.

In brief my invention consists of a shaking grid provided with a share member over which grid the potatoes are drawn by means of an endless conveyer passed through a rotating shaw, dirt and stray removing member and finally delivered into a receptacle. Each of these different elements is operated by the forward motion of the machine itself which will hereinafter be more particularly described in the accompanying specification and drawings.

In the drawings, Figure 1 represents a perspective view of my machine. Fig. 2 an end view of my device. Fig. 3 is a sectional view on line 2—2 of Fig. 2.

Referring to the drawings, my invention consists substantially of a supporting frame A provided with a shaft 10 bracket members 11 and 12 standards 13 and a receptacle supporting member 14. The grid member B consists preferably of two portions 15 and 16. The grid member 16 is stationary and is suitably supported in the standard 13 at a suitable inclination from the horizontal. The remaining portion 15 of the grid member B is preferably made to vibrate in order to shake the dirt and shaw clear of the potatoes, and is loosely supported in the bracket members 11 and 12.

The grid member B consists substantially of a plurality of bars or rods 17 held in position by suitable binding rods such as 18 and 19, the extremities of which extend through enlarged slots 20 and 21 adapted to allow the grid 15 to vibrate freely, preferably in a horizontal plane. The vibrating motion of the grid 15 is accomplished with the aid of an oscillatory member C which may consist of a crank member 22 provided with a pin 23 which rotates in an aperture 24 provided in the extremity of the rod 19. The said oscillatory member C may be driven from the axle of the machine in any well known manner, such as through the gear 25.

A share member 26 is provided at the foremost extremity of the grid adapted to dig into the ground to unearth the potatoes and cause them to slide upwardly onto the grid.

Shafts 27 and 28 are provided in the frame, suitable bearings being provided therefor in the bracket members 11 and 12, and rotating with said shafts are the toothed or gear wheel 29 and 30. A shaft 31 is likewise located in the standard 13 provided with driving pulleys or gear members 32 which may be driven from the shaft 33 of the machine by any well known means such as the gear wheels 34 and chain 35. The shaft 28 is provided with a pinion 36 which meshes with the pinion 25 thus transmitting the motion to the oscillatory member C.

The conveyer member D of the device consists preferably of endless chains or belts adapted to be engaged by the gear wheels 29 and 30 and driven by the driving pulleys 34. Said chains 37 are provided at intervals with a plurality of conveyer members 38 of any convenient style those shown being pivoted to the chains by suitable hinge members 39. The chains 37 are further provided with a rake member 40 provided with a plurality of teeth 41 and suitably secured to the chains, the use of said rake members preventing the grid B from being clogged with earth.

Upon reaching the top of the grid B the potatoes pass the rotating cleansing element D which removes all the shaws and green substance therefrom. Said cleansing element D consists preferably of a hub 42 provided with a plurality of radially extending cutting members 43 and may be driven from the shaft 33 in any suitable manner. According to my invention I employ a shaft 44 supported in suitable bearings 45 and provided with pinions 46 and 47 which mesh with gears 48 and 49 provided on the shaft 33 and cleansing element D respectively.

In order to adjust the working depth of the machine I preferably employ a standard E provided with a toothed rack 50 on which operates the manually operated dog 51 and handle 52. A chain 53 is secured to the handle 52 run through an eye or pulley 54 on the rack 50 and secured to the shaft 10.

At the rear of the machine a platform 55 is provided supported on the supporting members 14 upon which a sack or any other receptacle may be placed.

The machine may be driven by animal power as shown in the drawing but is not limited thereto.

From the above specification it will be seen that I have provided a potato digging machine wherein the potatoes are unearthed by the share 26, conveyed over a shaking grid 15 by the conveyer D and thereby freed from earth led over the inclined grid 16 cleansed of their shaws by the rotating member E and finally deposited in the receptacle on the platform. Also I have provided suitable means for adjusting the working depths of my machine.

As many changes could be made in the above construction and many apparently widely different embodiments of my invention within the scope of the claims, without departing from the spirit or the scope thereof, it is intended that all matter contained in the accompanying specification and drawings shall be interpreted as illustrative and not in a limiting sense.

What I claim as my invention is:—

1. A machine of the class described comprising digging means, a grid member formed with a stationary portion and a movable portion, means for conveying the potatoes along the grid member and means driven by said conveyer means for reciprocating the movable grid member laterally and longitudinally, as and for the purpose specified.

2. A machine of the class described comprising a frame having brackets thereon, a share, a grid member formed with a stationary portion, and a movable portion, transversely extending rods mounted on said brackets and designed to carry the movable portion of the grid, one of said rods being provided with an aperture near the end thereof, a vertically disposed crank member rotatably mounted on the frame designed to engage on the lower end with the said aperture, means for conveying the potatoes along the grid member, and means operated by said conveyer means for rotating said crank member as and for the purpose specified.

3. A machine of the class described comprising digging means, a grid formed with an angularly disposed stationary portion and a movable portion, means for conveying the potatoes along the grid, means for reciprocating the movable grid, a rotary hub located below the upper edge of the angularly disposed grid, a plurality of radially extending cutting members carried by said hub, a beveled pinion mounted in said hub, a shaft, a beveled pinion carried by said shaft meshing with the first said beveled pinion designed to transmit rotary motion thereto, as and for the purpose specified.

In witness whereof I have hereunto set my hand in the presence of two witnesses.

THÓGER PETER ERIKSEN.

Witnesses:
JAMES MITCHELL,
D. C. A. RAYE.

Copies of this patent may be obtained for five cents each, by addressing the "Commissioner of Patents, Washington, D. C."